United States Patent
Pan

(10) Patent No.: US 11,844,328 B2
(45) Date of Patent: Dec. 19, 2023

(54) PET HAMMOCK FOR VEHICLE

(71) Applicant: Min Pan, Hangzhou (CN)

(72) Inventor: Min Pan, Hangzhou (CN)

( * ) Notice: Subject to any disclaimer, the term of this patent is extended or adjusted under 35 U.S.C. 154(b) by 445 days.

(21) Appl. No.: 17/002,746

(22) Filed: Aug. 25, 2020

(65) Prior Publication Data

US 2022/0061264 A1 Mar. 3, 2022

(51) Int. Cl.
*B60N 2/60* (2006.01)
*A01K 1/02* (2006.01)

(52) U.S. Cl.
CPC .......... *A01K 1/0272* (2013.01); *B60N 2/6009* (2013.01); *B60N 2/6027* (2013.01)

(58) Field of Classification Search
CPC ... B60N 2/6027; B60N 2/6009; A01K 1/0272
See application file for complete search history.

(56) References Cited

U.S. PATENT DOCUMENTS 9,845,033 B1 * 12/2017 Umlauf .................... B60N 2/36

OTHER PUBLICATIONS

"Pecute Car Back Seat Cover(New Version)". http://www.pecute.net/blog/pecute-car-back-seat-cover-new-version (Year: 2019).*

* cited by examiner

*Primary Examiner* — Syed A Islam
(74) *Attorney, Agent, or Firm* — Raymond Y. Chan; David and Raymond Patent Firm

(57) ABSTRACT

A pet hammock for vehicle, adapted for accommodating one or more pets between a front seat and a rear seat of a vehicle, includes a main body including a front panel, a rear panel and a base panel, and a mounting unit including a front hanger and a rear hanger arranged for mounting the main body between the front seat and the rear seat through a plurality of anchor points provided at the front seat and the rear seat respectively, such that the base panel is suspendedly supported between the front hanger and the rear hanger while the front hanger and the rear hanger are secured with the front seat and the rear seat at the anchor points thereof. The front panel has a window covered with a see-through screen for communicating the front seat with the rear seat.

10 Claims, 7 Drawing Sheets

PET HAMMOCK FOR VEHICLE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to vehicle accessories, and more particularly to a pet hammock adapted to be arranged between two rows of seats of a transportation vehicle for pets.

Description of Related Arts

For most pets, such as dogs or cats, being transported in vehicle with their owner is a happy experience. However, for the owner, it is troublesome to prepare stuffs not only for his or her pets but also for making corresponding arrangement in the vehicle. For example, a dog seat belt is required for security and safety to the dog while driving.

Even though a pet is not traveling with its owner everyday, hairs, mud, dirt or scratches are generally left behind after each transportation with the vehicle. There is a conventional pets cage adapted to be placed inside the vehicle, but it is very unfriendly for pets. Some pets may get car sick, and it will become worse especially when the rear windows of vehicle are closed. Also, the owner has to clean up for car maintenance and also has to comfort and take care his or her pet after each ride.

There is also a conventional seat cover adapted for rear seat of vehicle that is used to removably place on the surface of the back seat and bench seat to fully wrap the back seat and the bench seat to be protected from dirt. The conventional seat cover is required to be cleaned after used, and some of conventional seat covers are made of plastic as a disposable item adapted to be removed and disposed after used, which is unfriendly to environment. Also, while driving, the passenger pet may easily fall off from the slippery seat cover to the floor that would result in unexpected injury to the pet.

Another disadvantage of the conventional bench type seat cover is that the pet frequency jumps to the front seat that bothers the driver. For safety reason, it is a desired for all drivers to have an object such as extra fence mounted between the front seat and the rear seat to prevent the pets from freely jumping up and down or from the rear to the front to disturb the driver's attention from the road.

To fulfill the demands in the market, while having a ride with pets, it is required to protect the seat cover, to comfort the pets to prevent car sick, and most importantly, to ensure the driving safety. However, it is really difficult to satisfy the pets, the driver and the sanitation of inner environment of vehicle with single accessory at the same time.

SUMMARY OF THE PRESENT INVENTION

The invention is advantageous in providing a pet hammock for vehicle, which is adapted to be arranged between two rows of seats of a vehicle for accommodating one or more pets driving transportation in the vehicle in a safe and comfortable manner for the pets.

Another advantage of the invention is to provide a pet hammock for vehicle, which allows fresh air flowing between the front seat and the rear seat of the vehicle to avoid anxious of the pets and prevent car sick during transportation in the vehicle.

Another advantage of the invention is to provide a pet hammock for vehicle, wherein the rear seat, including for example the back seat and the bench seat, is fully covered to prevent polluting the rear seat and prevent the pet passengers from falling off from rear seat or jumping to the front seat of the vehicle.

Another advantage of the invention is to provide a pet hammock for vehicle, which is detachably mounted between the front seat and the rear seat and easily converted between a full-cover pet hammock and a semi-cover pet hammock while it is required to share the rear seat with human passenger.

Another advantage of the invention is to provide a pet hammock for vehicle, which provides a see-through window facing to the front seat, so that the pets and driver or passenger travel in the vehicle can see each other clearly at all time, especially for the passenger in the front seat to monitor the activity of the pet carried on the rear seat during driving.

Another advantage of the invention is to provide a pet hammock for vehicle, wherein the pet hammock is configured to be capable of securely installing between two or more anchor points. In one embodiment, the two or more anchor points are provided at the head rests of the vehicle so as to position the pet hammock covering the rear seat and form a safe and free area for the pets. Accordingly, the pets are difficult to jump to the front seat to interrupt the driver.

Another advantage of the invention is to provide a pet hammock for vehicle, wherein elements for installing, detaching or converting are hidden for pets, so that the pet hammock is stable and securely mounted in position after it is setup.

Another advantage of the invention is to provide a pet hammock for vehicle, wherein the pet hammock is configured to be cooperated with conventional seat belt to ensure the driving safety.

Another advantage of the invention is to provide a pet hammock for vehicle, which is comfortable and durable for protection against liquid and spills, and is easy to clean or wash.

Additional advantages and features of the invention will become apparent from the description which follows, and may be realized by means of the instrumentalities and combinations particular point out in the appended claims.

According to the present invention, the foregoing and other objects and advantages are attained by a pet hammock for vehicle, adapted for accommodating one or more pets between a front seat and a rear seat of a vehicle, comprising:

a main body comprising a base panel, a front panel and a rear panel, wherein the front panel and the rear panel are respectively extended from two sides of the base panel, wherein said front panel has a window preferably configured for providing at a position for communicating an accommodating space of the main body defined between the front seat and the rear seat, and;

a mounting unit arranged for mounting the main body between the front seat and the rear seat of the vehicle through a plurality of anchor points provided at the front seat and the rear seat, wherein the mounting unit comprises a front hanger provided at an upper portion of the front panel and a rear hanger provided at an upper portion of the rear panel, wherein the front hanger and the rear hanger are configured for coupling with the anchor points of the front seat and the rear seat of the vehicle for supporting the main body between the front seat and the rear seat, wherein the base panel is suspendedly supported between the front hanger and the rear hanger while the front hanger and the rear hanger are secured with the front seat and the rear seat at the anchor points thereof; and a screen, made of a see-through material, mounted on the window in the front panel, whereby by securing the front and rear hangers with the anchor points of the front seat and the rear seat of the vehicle respectively, the rear panel is supported on a back seat of the rear seat, the base panel is supported on a bench seat of the rear seat and the front panel is arranged to be extended from a front side of the base panel to an upper portion of the front seat, so as to define said accommodating space for the one or more pets between the front panel, base panel and the rear panel.

In one embodiment, the front panel of the main body comprises at least a first front portion, a second front portion and a third front portion, wherein two connectors are provided to connect the first front portion with the second front portion and connect the second front portion with the third front portion respectively, wherein the window is formed at said second front portion which is positioned between the first and third front portions while the screen completely covers the window.

In one embodiment, the connectors are zippers and the screen is made of mesh material having a plurality of micro holes for air ventilating.

In one embodiment of the present invention, the main body further comprises two ridgelines respectively formed between the front panel and the base panel and between the base panel and the rear panel for allowing the one or more pets lying along the across of the pet hammock.

In one embodiment of the present invention, the base panel of the main body further comprises an upper cover covered on the upper panel and a base cover covered on the base cover, wherein the base cover is preferred to be made of anti-slip material for securely attaching with the bench seat of the rear seat.

In one embodiment of the present invention, each of the front hanger of mounting unit comprises at least a pair of front hanger members configured to be detachably secured to two head rests of the front seat and each of the rear hanger of mounting unit comprises at least a pair of rear sling elements configured to be detachably secured to two head rests of the rear seat by means of buckling.

In one embodiment of the present invention, the main body further comprises at least two seat belt openings on the ridgeline between the base panel and the rear panel.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
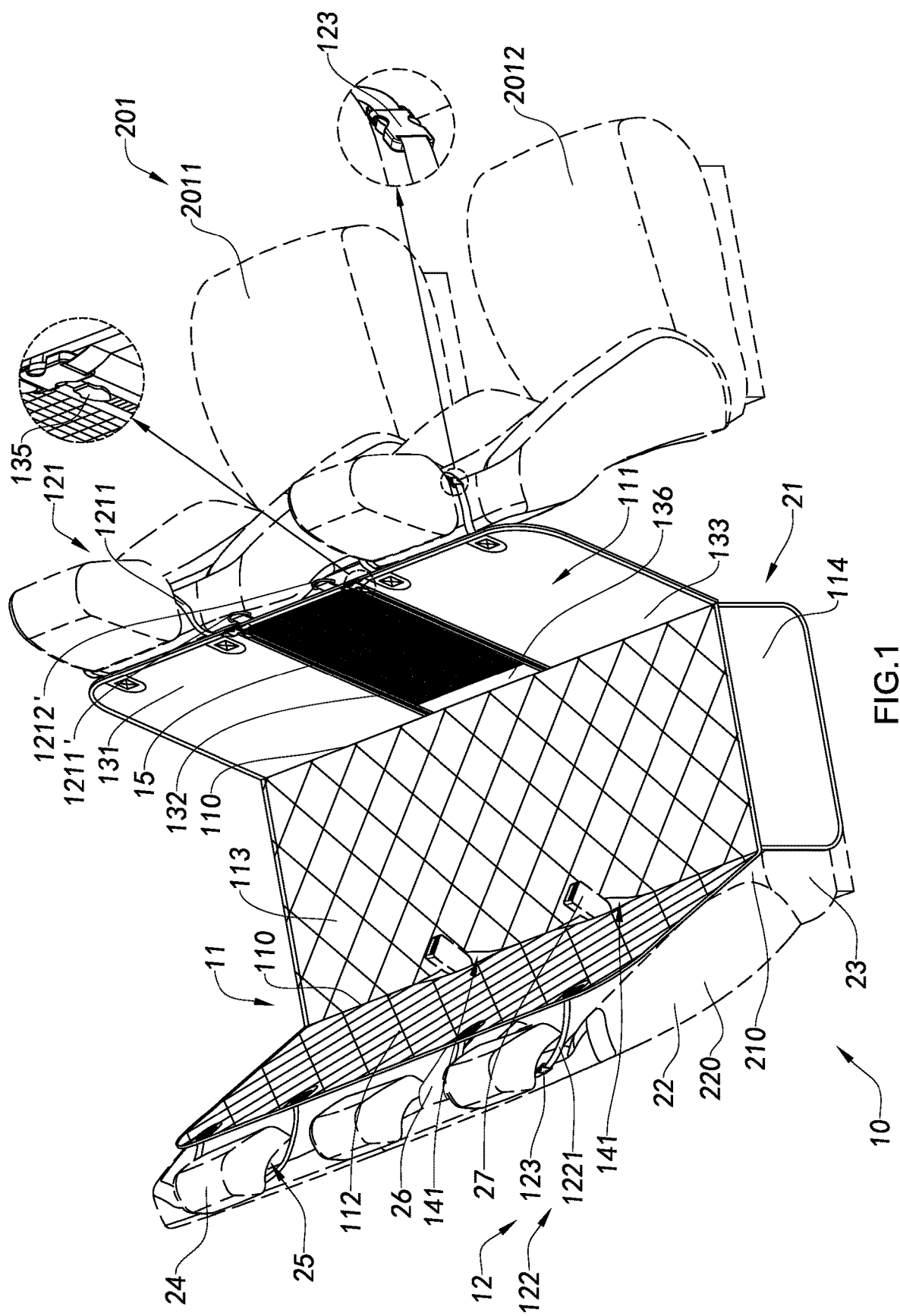
FIG. 1 is a perspective view of a pet hammock for vehicle according to a preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIGS. 1 to 7, a pet hammock 10 for vehicle according to a preferred embodiment of the present invention is illustrated, which is adapted to be detachably positioned and mounted inside a vehicle, wherein for disclosure purpose, the pet hammock 10 is illustrated as installed in a conventional vehicle, for example, a car, a truck, a SUV or a MPV, as shown in FIGS. 1-5.

Generally, a conventional vehicle comprises two rows of seats, generally a front seat 201 and a rear seat 202, wherein the front seat 201 includes two front seat units 2011, 2012 and the rear seat 202 including a bench seat 210 having a seat bottom surface 21 and two seat side surfaces 23 and a back seat 220 having a back seat surface 22. The pet hammock 10 is configured to be detachably mounted between the front seat 201 and the rear seat 202. Each front seat unit 2011, 2012 includes a front head rest 24 detachably mounted on a top side thereof through typically a pair of head rest arms 25. The rear seat generally includes two to three rear head rests 24 detachably mount on a top side thereof, wherein each of the front head rests 24 is mounted on top of the back seat of the corresponding front seat unit 2011, 2012 and each of the rear head rests 24 is mounted on top of the back seat of the corresponding rear seat 202, and that each of the head rests 24 is mounted on top of the corresponding back seat by two heat rest arms 25. In addition, two or more seatbelt receivers 27 are provided at the seat bottom 21 for fastening the passenger sit on the seat bottom 21 with the seat belt.

The pet hammock 10 is adapted to cover the rear seat 202 and easily converted between a full-cover pet hammock and a semi-cover pet hammock for sharing the rear seat for pets and passengers.

According to the preferred embodiments, the pet hammock 10 comprises a main body 11 and a mounting unit 12 coupled with the main body 11 and arranged for mounting the main body 11 between the front seat 201 and the rear seat 202 of the vehicle for accommodating one or more pets between the front seat 201 and the rear seat 202 of the vehicle, wherein by securing the mounting unit 12 to an upper portion of the front seat 201 and an upper portion of the rear seat 202, the main body 11 is unfolded, stretched and extended between the front seat 201 and the rear seat 202 to cover the seat bottom surface 21 of the bench seat 210 and the back seat surface 22 of the back seat 220 of the rear seat 202, so as to define an accommodating space between the front seat 201 and the rear seat 202, wherein at least two anchor points are formed at where the mounting unit 12 coupled with the front seat units 2011, 2012 and the rear seat 202. According to the preferred embodiment, the mounting unit 12 is secured with the head rest arms 25 of the front head rests and the rear head rests 24 for suspendedly hanging the main body 11 on the rear seat 202 of the vehicle.

Furthermore, the mounting unit 12 comprises a front hanger 121 and a rear hanger 122 respectively extended from a front side and a rear side of the main body 11. When the front hanger 121 and the rear hanger 122 are respectively coupled with the front and rear head rests 24. According to the preferred embodiment, the front hanger 121 comprises a pair of front hanger members 1211 secured around the pairs of head rest arms 25 of the two front seat units 2011, 2012 respectively and the rear hanger 122 comprises a pair of rear hanger members 1221 secured around the pair of head rest arms 25 of two of the head rests 24 of the back seat 202 respectively, such that the secure supporting of the pair of front hanger members 1211 of the front hanger 121 and the pair of rear hanger members 1221 of the rear hanger 122 with the corresponding head rest arms 25 of the front head rests and rear head rests 24 form the anchor points accordingly for the main body 11. Each of the front hanger members 1211 and the rear hanger members 1221 can be embodied as a fastening strap to loop around the corresponding pair of head rest arms 25 to form the anchor point, as shown in FIG. 1, for bearing the weight of the one or more pets accommodated in the accommodating space define by the main body 11 to prevent the pets from falling or jumping from the rear seat 202 to the front seat 201.

By securing the front and rear hangers 121, 122 with the anchor points of the front seat 201 and the rear seat 202 of the vehicle respectively, the rear panel 202 is supported on a back seat 220 of the rear seat 202, the base panel 113 is supported on a bench seat 210 of the rear seat 202 and the front panel 111 is arranged to be extended from a front side 110 of the base panel 113 to an upper portion of the front seat 201, so as to define an accommodating space for the one or more pets between the front panel 111, base panel 113 and the rear panel 112.

Figure 2:
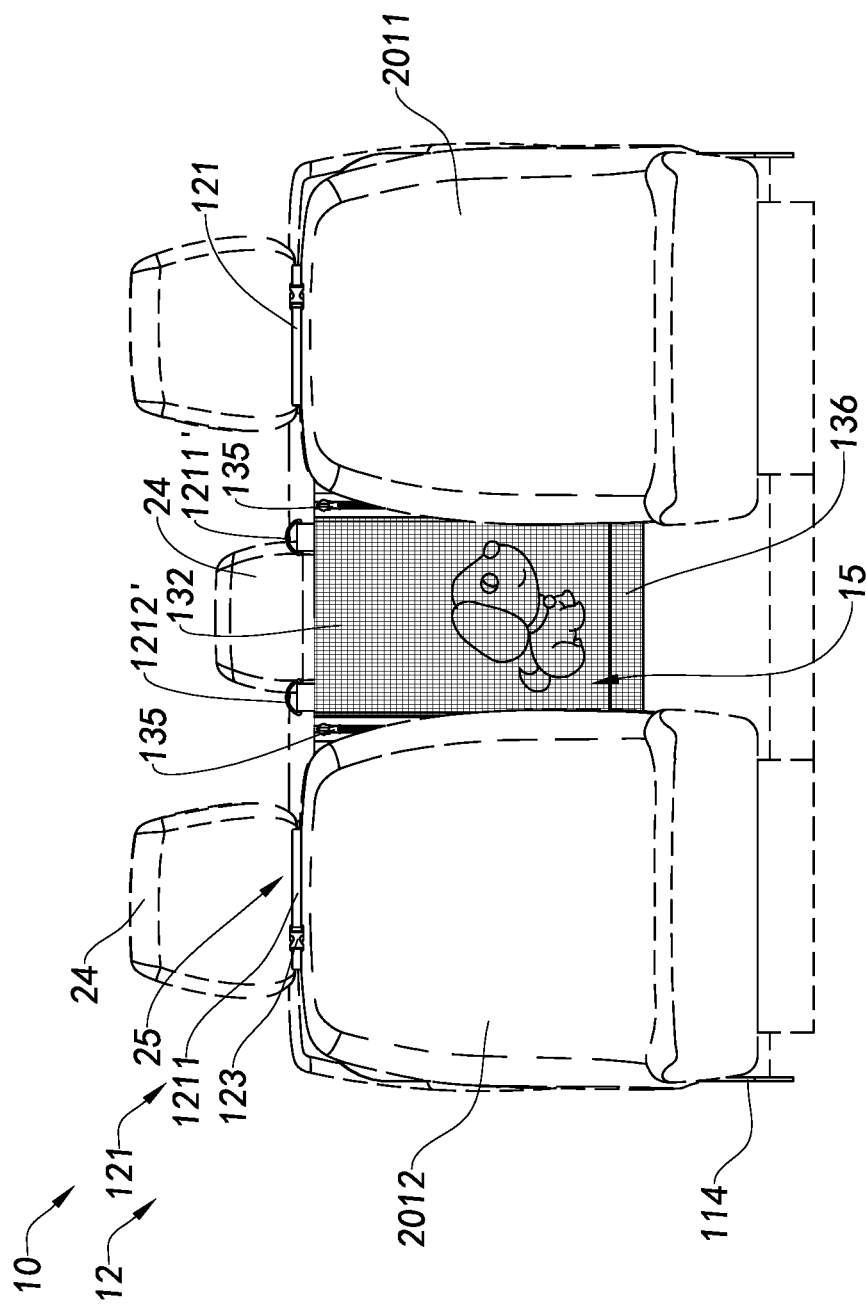
FIG. 2 is a front view of the pet hammock for vehicle according to the above preferred embodiment of the present invention.

Each of the front and rear hanger members 1211, 1221 comprises a first strap 1231 having one end connected to the main body 11, a second strap 1241 having one end connected to the main body 11, a male fastener 123 provided at another end of the first strap 1231, and a female fastener 124 provided at another end of the second strap 1241, such that the first and second straps 1231, 1241 are arranged to wrap around the corresponding pair head rest arms 25 and then fasten the male and female fasteners 123, 124 so as to secure around the corresponding pair of head rest arms 25 of the head rest 24 of the rear seat 201 or rear seat 201, and thus to support the main body 11 between the front seat 201 and rear seat 202 and hang down from the pairs of head rest arms 25 of the head rests 24 respectively. In order words, by means of the front or rear hanger member 1211, 1221, the front hanger 121 and the rear hanger 122 is able to detachably mount around the corresponding pair of head rest arms 25 of the front seat 201 or the rear seat 202. The male and female fasteners 123, 124 can be loop and hook fasteners, male and female buckles, and etc., as shown in FIGS. 1-2. It is worth mentioning that, to person skill to the art, it is apparent to modify each of the front and rear hanger members 1211, 1221 to an elastic strap having two ends connected to a side edge of the main body 11 to form a loop shape member adapted for encircling around the corresponding pair of head rest arms 25 of the head rest 24 of the front seat 201 or rear seat 202. Or, alternatively, the first and second straps 1231, 1241 are made of elastic straps so that, after fastening the male and female fasteners 123, 124 together, an elastic loop member is formed that can simply put on and encircle around the corresponding pair of head rest arms 25 of the head rest 24 of the front seat 201 or the rear seat 202.

In other alternative mode, the front and rear hanger 121, 122 can be embodied as a head rest sleeve for simply putting on and encasing the corresponding head rest 24 of the front seat 201 or rear seat 202 so as to mount and support the main body 11 between the front seat 201 and the rear seat 202.

According to the preferred embodiment of the present invention, the main body 11 comprises a front panel 111, a rear panel 112 and a base panel 113, wherein the front panel 111 and the rear panel 112 are respectively extended from two longitudinal sides of the base panel 113. As shown in FIGS. 1 to 5, the longitudinal length and transversal width of the rear panel 112 is preferred to be or slightly larger than the longitudinal length and transversal width of the back seat 220 of the rear seat 202 and the longitudinal length and transversal width of the base panel 113 is preferred to be equal to or slight larger than the longitudinal length and transversal width of the bench seat 210 of the rear seat 202, so as for completely covering the back seat surface 22 of the back seat 220 and the seat bottom surface 21 of the bench seat 210 of the rear seat 202. Correspondingly, the front panel 111 has a longitudinal length equal to or slightly larger than the front seat 201, extended from an outer side of one of the two front seat units 2011 to an outer side of another front seat units 2011.

In addition, the front panel 111 of the main body 11 further comprises a first front portion 131, a second front portion 132 and a third front portion 133, wherein two connectors 135 are provided to connect the first front portion 111 with the second front portion 132 and connected the second portion 132 with the third front portion 133 respectively. Each of the first and third front portions 131, 133 is preferred to have a width equal to or slightly larger than the width of the two front seat units 2011 respectively while the width of the second front portion 132 is preferred to have a width adapted for fittingly extended to shelter the spaced between the two front seat units 2011, as shown in FIGS. 1 to 5. Accordingly, when the two connectors 135 connect the second front portion 132 with the first and third front portion 131, 133 to form an integral panel, as shown in FIGS. 1 and 2, the front panel 111 is arranged to shelter the rear seat 202 space from the front seat 201 and separate the front seat 201 from the one or more pets accommodated in the rear seat 202 from the driving space of the front seat 201 so as to prevent the pets from jumping to the front seat 201.

The front panel 111 has a window 15 provided at a position for communicating the space of the rear seat 202 with the front seat 201. According to the preferred embodiment of the present invention, the window 15 is formed in the second front portion 132 positioned between the two front seat portions 2011 and is a see-through window facing to the front seat 201, so that the pets and driver or passenger travel in the vehicle can see each other clearly at all time, especially for the passenger in the front seat 201 to take care and/or monitor the activity of the pet carried on the rear seat 202 during driving.

The pet hammock further comprises a screen 151 which is made of see-through material, such as a metal or plastic net or a mesh material having a plurality of micro holes for air ventilating, and mounted on the window 15 in the second front portion 132 of the front panel 111 so as to completely cover the window 15.

The two front hanger members 1211 of the front hanger 121 are affixed to upper side portions of the first and third front portion 131, 133 of the front panel 111 respectively and arranged to be extended upwardly to secure with the two head rests 24 of the two front seat units 2011, 2012 respectively. Similarly, the two rear hanger members 1221 of the rear hanger 122 are affixed to upper side portions of the rear panel 112 respectively and arranged to be extended upwardly to secure with the two head rests 24 of the rear seat 202 respectively.

According to the preferred embodiment, the base panel 113 is provided between the front panel 111 and the rear panel 112 which are respectively extended from two longitudinal sides of the base panel 111. After the male and female fasteners 123, 124 of the front hanger members 1211 are fastened around the corresponding pairs of head rest arms 25 of the two head rests 24 of the two front seat unit 2011, 2012, and the male and female fasteners 123, 124 of the rear hanger members 1221 are connected around the corresponding pairs of head rest arms 25 of the two head rests 24 of the rear seat 202, the front panel 111, the base panel 113 and the rear panel 112 form an installed pet hammock 10 unfolded and extended to completely cover the back seat surface 22 of the back seat 220, the bottom seat surface 21 of the bench seat 210, and extended from the bench seat 210 to the head rests 24 of the front seat 201 to define the accommodating space for accommodating one or more pets between the front seat 201 and the rear seat 202.

Moreover, the main body 11 further comprises two ridgelines 110, i.e. along the two longitudinal sides of the base panels 113, between the front panel 111 and the base panel 113 and between the base panel 113 and the rear panel 112, so that the second front portion 132 of the front panel 111 is stretched by the two front hanger members 1211 as a fence between the front seat 201 and the rear seat 202, and the rear panel 112 is stretched by the two rear hanger members 1221 as a cover on the back seat 220 and the bench seat 210 of the rear seat 202. It is worth to mention that the base panel 111 is preferred to be flatly attached on the bottom seat surface 21 of the bench seat 210 of the rear seat 202 for the pets resting thereon.

Furthermore, the main body 11 has two or more seat belt openings 141 in the ridgeline 110 between the base panel 111 and the rear panel 112. The seatbelt receivers 27 of the rear seat 202 are adapted to extend out through the seat belt openings 141 for seatbelt fastening as usual. For example, when the vehicle is arranged with three seatbelt receivers 27 at the rear seat 202, the main body 11 has three belt openings 141 corresponding to the three seatbelt receivers 27, and the pet is capable of using pet seatbelt with any of the seatbelt receivers 27 after the pet hammock 10 covering the rear seat 202.

According to the preferred embodiment, the two connectors 135 are embodied zippers for detachably connecting the first front portion 131 with the second front portion 132 and the second front portion 132 with the third front portion 133. In other words, the first front portion 131 and the second front portion 132 are connected with each other side by side with one zipper 135, and the second front portion 132 and the third front portion 133 are connected with each other side by side with another zipper 135. That is, not only the two front hangers 121 are holding the first front portion 131 and the third front portion 133 in position, wherein the first, second and third front portions 131, 132, 133 hang down from the head rests 24 of the front seat 201 to the corresponding ridgeline 110 of the base panel 113, and that the first front portion 131, the second front portion 132 and the third front portion 133 are holding each other side by side to shelter the front seat 201 with the rear seat 202 when the zippers 135 are connected.

Preferably, the first front portion 131, the third front portion 133, the base panel 113, and the rear panel 112 are made to have waterproof surfaces. The two front hangers 121 are connected with the upper portions of the first front portion 131 and the third front portion 133 respectively. In order to further securely support the front panel 111, as shown in FIGS. 3 and 4, another pair of front hangers 121 each comprising a first front hanger member 1211' and a second front hanger element 1212', wherein the two first front hanger members 1211, each embodied as a loop connector, are provided at an upper edge of the second front portion 132 arranged for detachably securing to the two pairs of head rest arms 25 of the two head rests 24 of the two front seat units 2011, 2012 respectively with the two second front hanger elements 1212', each of which is embodied as a securing strap encircling one corresponding head rest arm 25 of the adjacent head rest 24 and fastening to the corresponding first front hanger member 1211' detachably.

Figure 3:
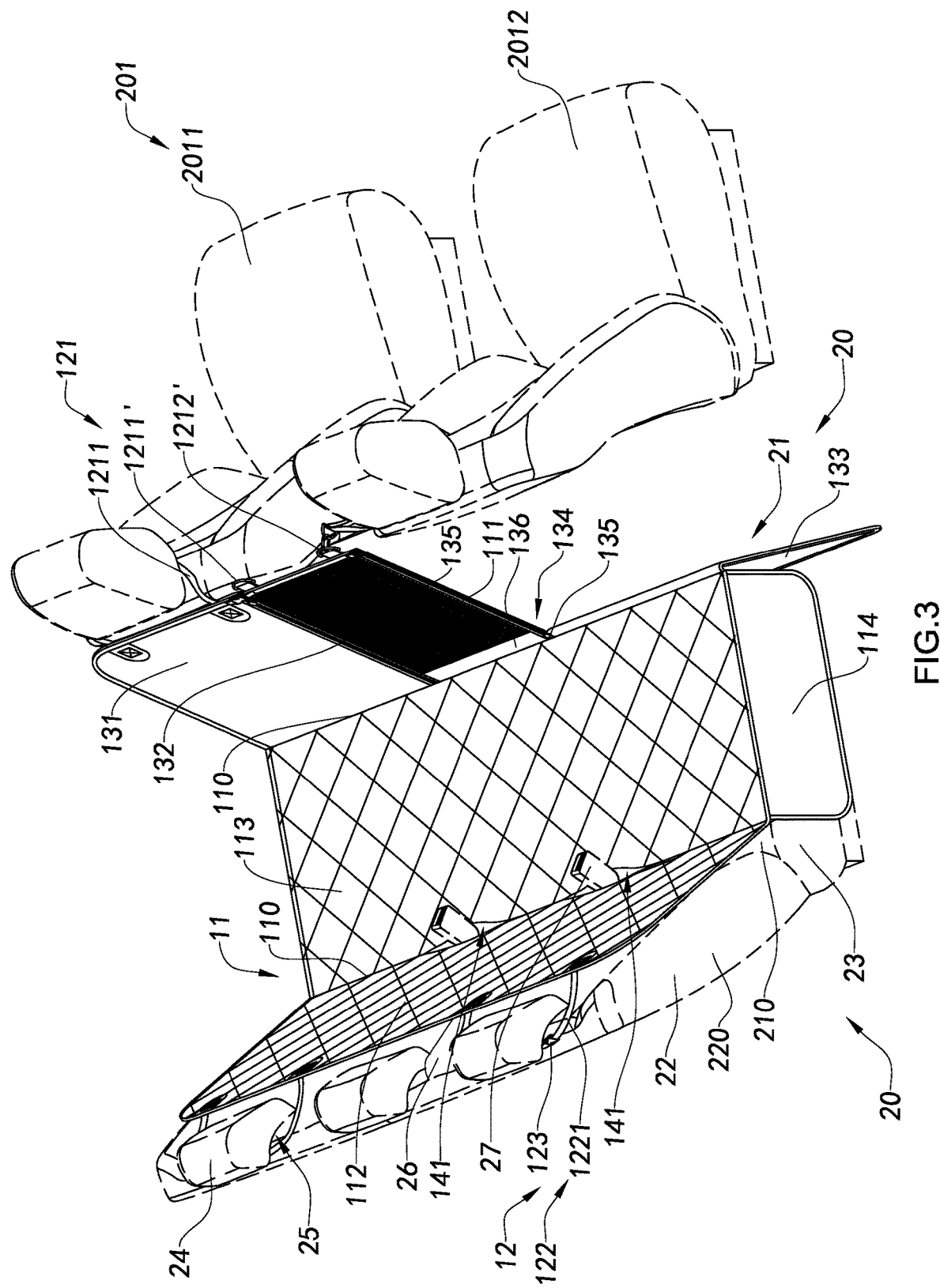
FIG. 3 is a perspective view of the pet hammock for vehicle according to the above preferred embodiment of the present invention, illustrating a semi-cover condition.
Figure 4:
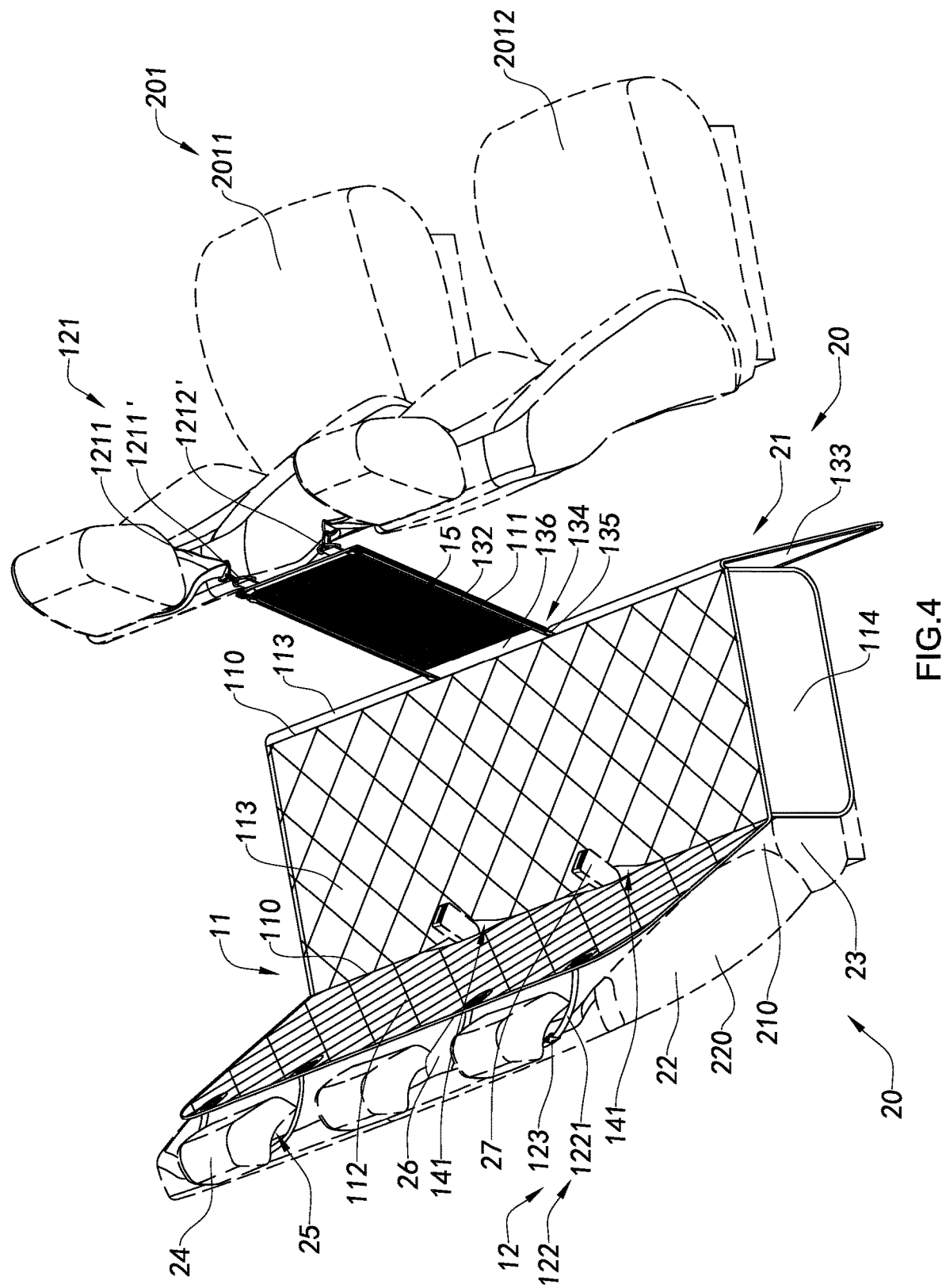
FIG. 4 is a perspective view of the pet hammock for vehicle according to the above preferred embodiment of the present invention, illustrating another semi-cover condition.

Accordingly, as shown in FIG. 3, the user may select to detach one of the first and third front portions 131, 133, for example the third front portion 133, from the corresponding head rest 24 of the second front seat unit 2012, that is unsecuring the front hanger member 1211 of the third front portion 133 from the headrest 24 of the second front seat unit 2012. Furthermore, as shown in FIG. 4, the user may even detach both the first and third front portions 131, 133 from the two head rests 24 of the two front seat units 2011, 2012, where the pair of front hanger members 1211 of the first and third front portions 131, 133 are unsecured from the headrests 24 of the two front seat units, 2011, 2012 respectively, while the second front portion 132 remained supporting in a middle position between the base panel 113 and the head rests 24 of the front seat 201 to shelter the front seat 201 with the rear seat 202.

Figure 5:
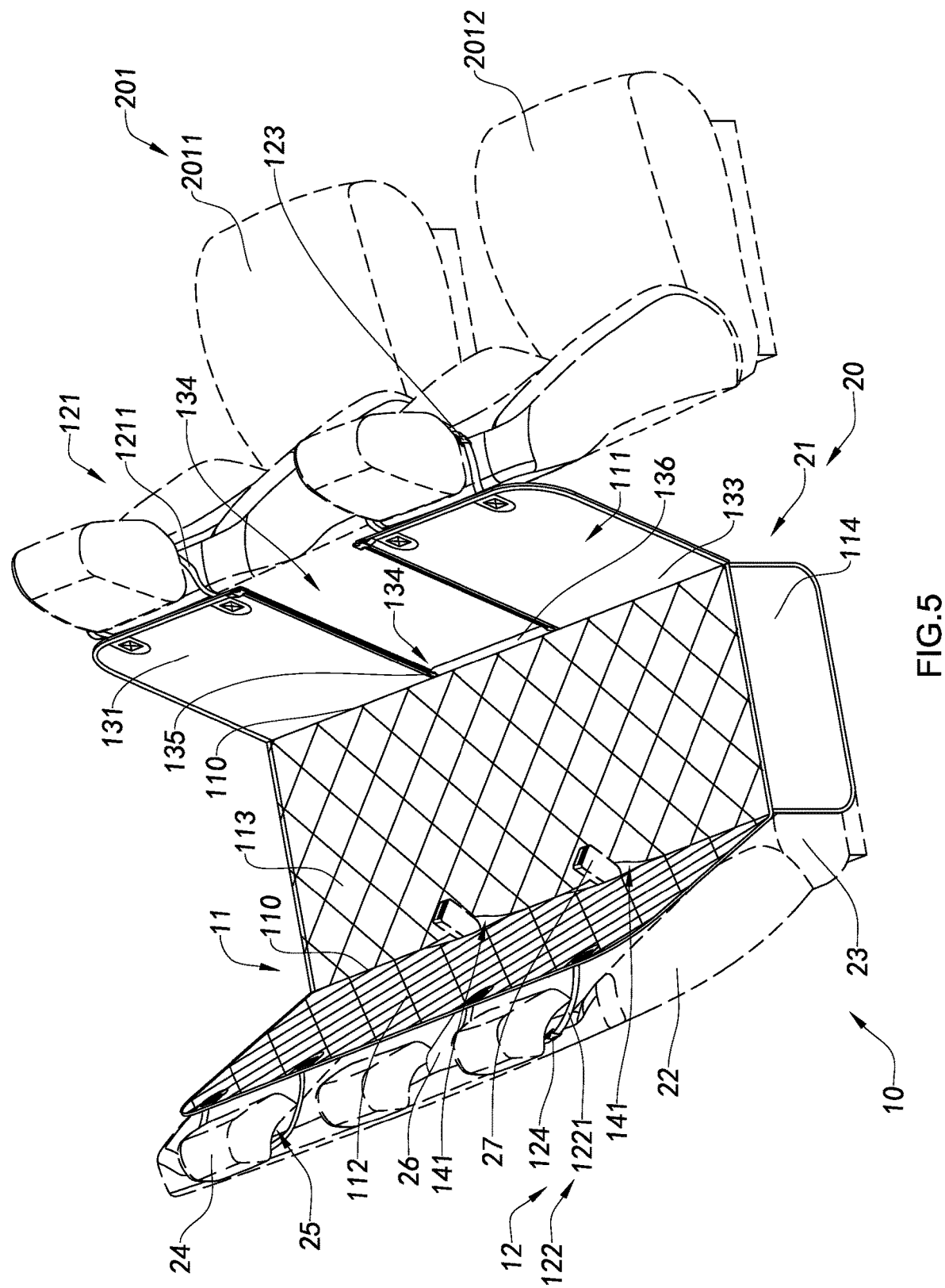
FIG. 5 is a perspective view of the pet hammock for vehicle according to the above preferred embodiment of the present invention, illustrating another semi-cover condition.

Referring to FIG. 5, by unzipping the two zipper type connectors 135, the second front portion 132 can be detached from the first and third front portions 131, 133 at both sides forming an opening 134 between the first and third front portions 131, 133 to enable communication between the front seat 201 and the rear seat 202, so that the driver or the front seat passenger may reach the pet(s) accommodating in the accommodating space defined by the pet hammock of the present invention in the rear seat 202 for assisting the pet(s) or other purposes.

According to the preferred embodiment, the second front portion 132 of the front panel 111 has a lower portion 136 which is made by rigid material like the first and third front portions 131, 133 and integrated extended from the adjacent side of the base panel 113 so as to strengthen the front panel 111, while the window 15 and the screen 151 mounted in the window 15 are provided above the lower portion 136, especially when the screen 151 is made of soft mesh material. In other words, the window 15 and its screen 151 are formed at an upper portion of the second front portion 132.

The see-through screen 151 in the window 15 of the second front portion 132 is light-transmissive through its micro holes enables the pets inside the accommodating space of the pet hammock 10 and the pet owner sit in the front seat 201 can see each other and ensuring air ventilation from the air conditioner provided at the dash board of the vehicle therethrough for the pet(s) to avoid car sick. According to the preferred embodiment, the screen 151 is preferably made of fabric wires, plastic lines or nylon threads, so that the second front portion 132 has enough strength for sheltering the pets as well as preventing damages by pets. Thus, the owner may monitor his or her pet(s) at any time and the pet(s) will feel secure whenever seeing the owner.

Figure 6:
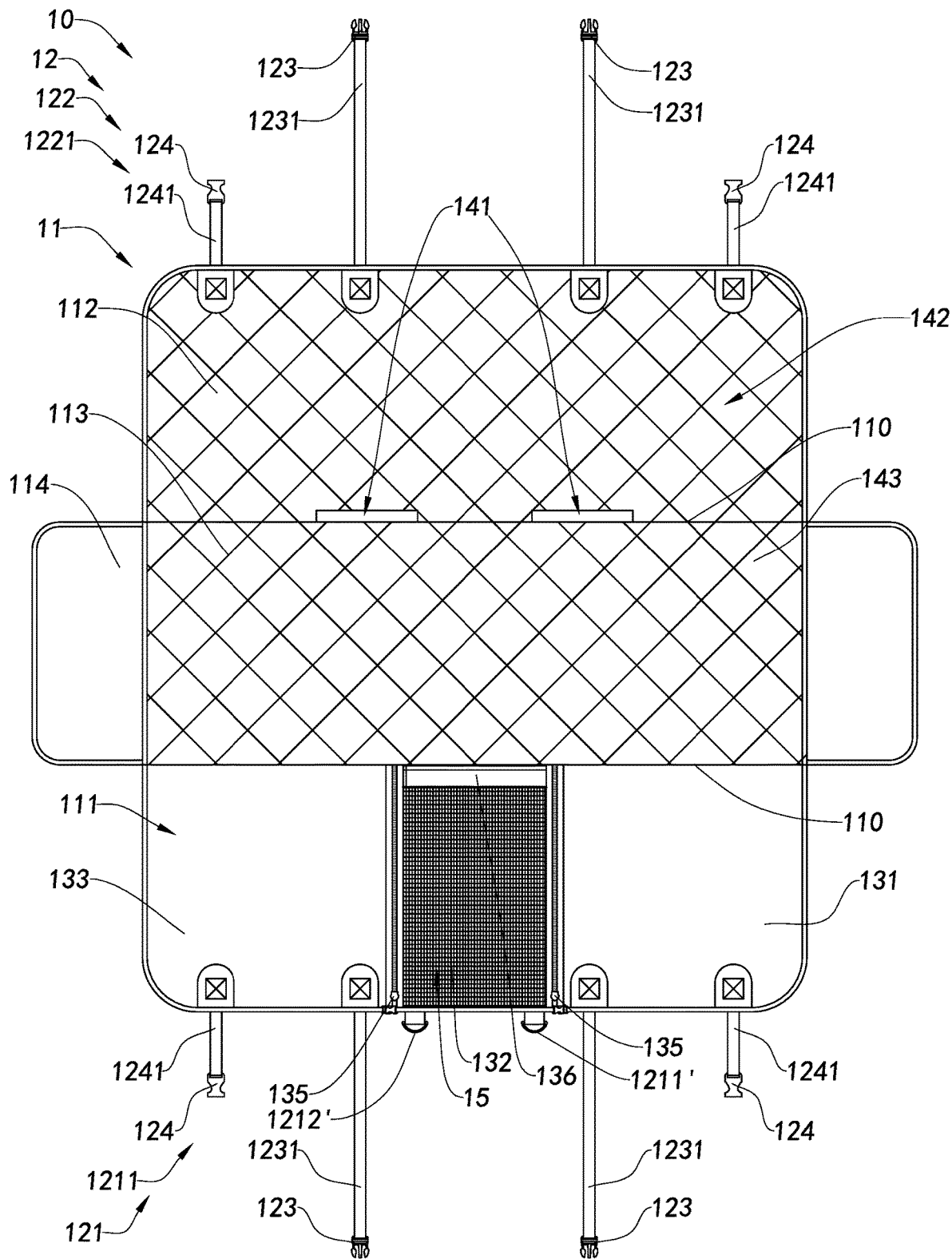
FIG. 6 is a top view of the pet hammock according to the above preferred embodiment of the present invention, illustrating the unfolding pet hammock.
Figure 7:
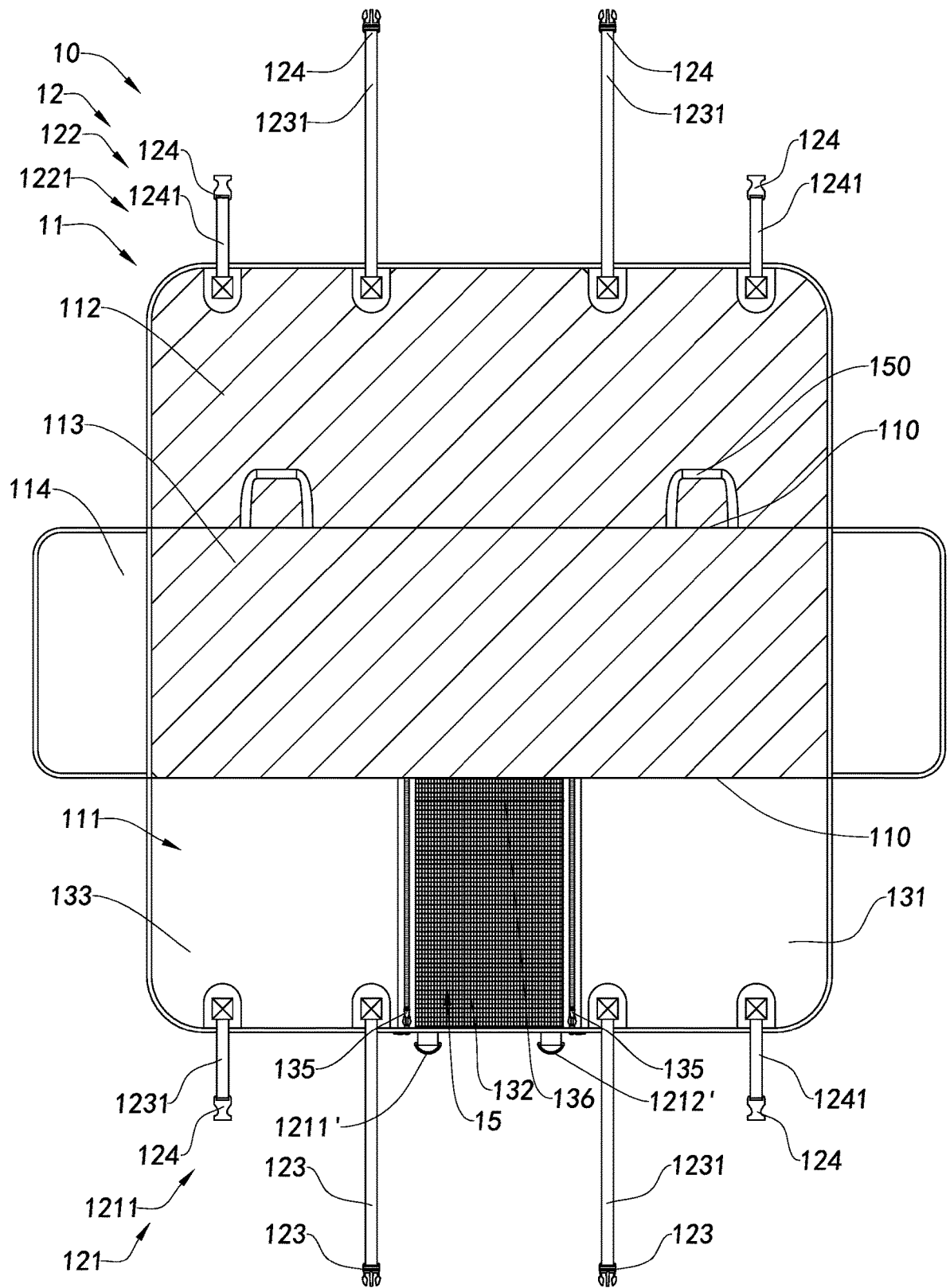
FIG. 7 is a bottom view of the pet hammock according to the above preferred embodiment of the present invention, illustrating an unfolding pet hammock.

Referring to FIGS. 6 and 7, the pet hammock 10 when it is not used can be unfolded as a flat configuration for ease of carrying and storage. When the pet hammock 10 is folded to be hanged and supported between the front seat 201 and the rear seat 202, as shown in FIGS. 1 and 2, the pet hammock 10 is a full-cover pet hammock that the first, second and third front portion 131, 132, 133 of the front panel 111 are integrally connected to fully shelter and isolate the front seat 201 and the rear seat 202 and define an isolated accommodating space for the one or more pet accommodated therein. When both or at least one of the first and third front portions 131, 133 is unsecured from the front seat 201, as shown in FIGS. 3 and 4, or the second front portion 132 is unzipped to detach from the first and third front portions 131, 133, as shown in FIG. 5, the pet hammock 10 is a semi-cover pet hammock, wherein a passenger may still sit on the right seat position of the rear seat 202, such as illustrated in FIG. 3, while having the pet accommodating on the left side of the passenger, or two passengers may sit on both the right and left seat positions of the rear seat 202, such as illustrated in FIG. 4, while the pet is accommodating between the passengers and the second front portion 132 may still preventing the pet from jumping to the front seat 201 area through the space between the two front seat units 2011, 2012. Alternatively, the passenger may sit in the middle position of the rear seat 202 such as illustrated in FIG. 5 where both the right and left sides of passenger can accommodate a pet there.

In an alternative mode of the invention, the rear panel 112 can also be provided with three portions similarly as the front panel 111, including a first rear portion, a second rear portion and a third rear portion connected side by side with two extra zippers. It is worth to mention that some type of the rear seat of the conventional vehicle comprises a handrail pivotally mounted between concealed inside the back seat 220 and placed upon the bench seat 210. The second rear portion of the rear panel 112 is also capable of converting to put down same as the second front portion 132 of the front panel 111 to allow the handrail to put down.

Preferably the first front portion 131, the third front portion 133, the base panel 113 and the rear panel 112 of the main body 11 are integrally formed with an upper cover 142 and a base cover 143, as shown in FIGS. 6-7. The base cover 143 is adapted to be positioned on the surface of the bench seat 210 and preferably made of anti-slip and waterproof material to keep the main body 11 in place. The upper cover 142 is also preferably made of waterproof fabric, so that the rear seat 202 is protected against liquid and spills, so that the main body is easily cleaned with a wet cloth or by vacuuming.

The main body 11 can be designed in colors or patterns to fulfill the requirements of the owner or the pets. Also, the main body 11 may further comprise several storage pockets on the upper cover 142 for receiving additional stuffs.

As shown in FIG. 7, the main body 11 further comprises at least two handles 150 connected to one of the ridgelines 110 between the base panel 113 with the front or rear panel 111, 112 of the main body 11 for ease of carrying. The front hanger 121 and the rear hanger 122 can be used to tie up the main body 10 in a folded roll manner.

Furthermore, the main body 11 further comprises two side panels 114 extended from two ends of the base panel 113, as shown in FIGS. 1-5, for naturally hanging down to cover the seat sides 23 of the bench seat 210.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A pet hammock for vehicle, adapted for accommodating one or more pets between first and second front seat units, having a space therebetween, of a front seat and a rear seat arranged behind the first and second front seat units of a vehicle, comprising:

a main body comprising a front panel, a rear panel and a base panel extended between said front panel and said rear panel, wherein said front panel has a window preferably configured for providing at a position for communicating an accommodating space of the main body defined between the first and second front seat units of the front seat and the rear seat, wherein said front panel has a first front portion adapted for mounting to a rear side of the first front seat unit, a second front portion adapted for mounting to a rear side of the second front seat unit and a third front portion provided between the first and second front seat units, wherein said third front portion has a lower portion integrally extended from said base panel, wherein said window is formed above said lower portion and comprises a screen extended from said lower portion such that said third front portion is constructed to have said lower portion integrated with said base panel and said screen extended from said lower portion; and a mounting unit arranged for mounting said main body between the front seat and the rear seat of the vehicle through a plurality of anchor points provided at the front seat and the rear seat, wherein the mounting unit comprises a front hanger provided at an upper portion of said front panel and a rear hanger provided at an upper portion of said rear panel, wherein said front hanger and said rear hanger are configured for coupling with the anchor points of the front seat and the rear seat, wherein said base panel is suspendedly supported between said front hanger and said rear hanger while said front hanger and said rear hanger are secured with the front seat and the rear seat at the anchor points thereof, wherein said front hanger comprises a first front hanger member coupled with said first front portion of said front panel for securing to said first front seat unit and a second front hanger member coupled with said second front portion of said front panel for securing to the second front seat unit, wherein said first and second front portions are configured to be capable of selectively detaching from the front seat unit and the second front seat unit respectively when said first front hanger member of said first front portion is unsecured from said first front seat unit, when said second front hanger member of said second front portion is unsecured from the second front seat unit, or when both said first and second front hanger members of said first and second front portions of the first and second front seat unit are unsecured, wherein said front hanger further comprises two third front hanger members spacedly provided at said third front portion of said front panel, wherein said first and second front hanger members are arranged for detachably securing with two anchor points provided at the front seat of the vehicle, wherein said two third front hanger members are arranged for detachably securing to the first front seat unit and the second seat unit respectively for further securing said third front portion to be positioned between said first front portion and said second front portion and to shelter the space between the first and second front seat units of the front seat;

whereby by securing said front and rear hangers with the anchor points of the front seat and the rear seat of the vehicle respectively, said rear panel is supported on a back seat of the rear seat, said base panel is supported on a bench seat of the rear seat and said front panel is arranged to be extended from a front side of said base panel to an upper portion of the front seat, so as to define said accommodating space for the one or more pets between said front panel, base panel and said rear panel.

2. The pet hammock, as recited in claim 1, wherein said rear hanger comprises at least a pair of rear hanger members affixed an upper portion of said rear panel, wherein said pair of rear hanger members are arranged for detachably securing with two head rests, as the two anchor points, of the rear seat of the vehicle.

3. The pet hammock, as recited in claim 2, The pet hammock, as recited in claim 2, wherein each of said front hanger members and said rear hanger members comprises a first strap having one end connected to said main body, a second strap having one end connected to said main body, a male fastener provided at another rend of said first strap, and a female fastener provided at another end of said second strap, such that aid first and second straps are arranged to wrap around a pair of head rest arms of the corresponding head rest.

4. The pet hammock, as recited in claim 2, wherein said main body further comprises two ridgelines respectively formed between said front panel and said base panel and between said base panel and said rear panel.

5. The pet hammock, as recited in claim 2, wherein said main body further comprises two side panels extended from two ends of said base panel for covering two sides of the bench seat of the rear seat respectively.

6. The pet hammock, as recited in claim 1, wherein said main body further comprises a rear cover provided on said rear panel and a base cover provided on said base panel, wherein said base cover is made of anti-slip and waterproof material and said rear cover is made of at least waterproof material.

7. The pet hammock, as recited in claim 2, wherein said main body further comprises a rear cover provided on said rear panel and a base cover provided on said base panel, wherein said base cover is made of anti-slip and waterproof material and said rear cover is made of at least waterproof material.

8. A pet hammock for vehicle, adapted for accommodating one or more pets between first and second front seat units, having a space therebetween, of a front seat and a rear seat arranged behind the first and second front seat units of a vehicle, comprising:

a main body comprising a front panel, a rear panel and a base panel extended between said front panel and said rear panel, wherein said front panel has a window preferably configured for providing at a position for communicating an accommodating space of the main body defined between the first and second front seat units of the front seat and the rear seat, wherein said front panel has a first front portion adapted for mounting to a rear side of the first front seat unit, a second front portion adapted for mounting to a rear side of the second front seat unit and a third front portion provided between the first and second front seat units, wherein said third front portion has a lower portion integrally extended from said base panel, wherein said window is formed above said lower portion and comprises a screen extended from said lower portion such that said third front portion is constructed to have said lower portion integrated with said base panel and said screen extended from said lower portion, wherein said screen is made of a see-through material mounted on said window in said front panel;

a mounting unit arranged for mounting said main body between the front seat and the rear seat of the vehicle through a plurality of anchor points provided at the front seat and the rear seat, wherein the mounting unit comprises a front hanger provided at an upper portion of said front panel and a rear hanger provided at an upper portion of said rear panel, wherein said front hanger and said rear hanger are configured for coupling with the anchor points of the front seat and the rear seat, wherein said base panel is suspendedly supported between said front hanger and said rear hanger while said front hanger and said rear hanger are secured with the front seat and the rear seat at the anchor points thereof, wherein said front hanger comprises a first front hanger member coupled with said first front portion of said front panel for securing to said first front seat unit and a second front hanger member coupled with said second front portion of said front panel for securing to the second front seat unit, wherein said first and second front portions are configured to be capable of selectively detaching from the front seat unit and the second front seat unit respectively when said first front hanger member of said first front portion is unsecured from said first front seat unit, when said second front hanger member of said second front portion is unsecured from the second front seat unit, or when both said first and second front hanger members of said first and second front portions of the first and second front seat unit are unsecured, wherein said front hanger further comprises two third front hanger members spacedly provided at said third front portion of said front panel, wherein said first and second front hanger members are arranged for detachably securing with two anchor points provided at the front seat of the vehicle, wherein said two third front hanger members are arranged for detachably securing to the first front seat unit and the second seat unit respectively for further securing said third front portion to be positioned between said first front portion and said second front portion and to shelter the space between the first and second front seat units of the front seat; and a first connector provided to detachably connect said first front portion with one side of said third front portion and a second connector provided to detachably connect said second front portion with another side of said third front portion to form said front panel, wherein said first connector is extended along one side of said screen and one side of said lower portion of said first front portion, wherein said second connector is extended along another side of said screen and another side of said lower portion of said first front portion, wherein an opening is formed between said first front portion and said second front portion of said front panel when said first and second connectors are disconnected and both said sides of said third front portion are detached from said first front portion and said second front portion respectively for enabling communication between the front seat and the rear seat through said opening, such that said screen and said lower portion of said first front portion are detached from said first front portion and said second front portion;

whereby by securing said front and rear hangers with the anchor points of the front seat and the rear seat of the vehicle respectively, said rear panel is supported on a back seat of the rear seat, said base panel is supported on a bench seat of the rear seat and said front panel is arranged to be extended from a front side of said base panel to an upper portion of the front seat, so as to define said accommodating space for the one or more pets between said front panel, base panel and said rear panel.

9. The pet hammock, as recited in claim 8, wherein each of said front hanger members and said rear hanger members comprises a first strap having one end connected to said main body, a second strap having one end connected to said main body, a male fastener provided at another rend of said first strap, and a female fastener provided at another end of said second strap, such that aid first and second straps are arranged to wrap around a pair of head rest arms of the corresponding head rest.

10. The pet hammock, as recited in claim 9, wherein said main body further comprises two ridgelines respectively formed between said front panel and said base panel and between said base panel and said rear panel.

* * * * *